United States Patent
Suomi et al.

(10) Patent No.: US 11,534,881 B2
(45) Date of Patent: Dec. 27, 2022

(54) MODULAR MACHINE AND METHOD OF ASSEMBLY

(71) Applicant: Amomatic Oy, Paimio (FI)

(72) Inventors: Kai Suomi, Paimio (FI); Pasi Vuorinen, Turku (FI); Casimir Kasvi, Turku (FI)

(73) Assignee: Amomatic Oy, Paimio (FI)

( * ) Notice: Subject to any disclaimer, the term of this patent is extended or adjusted under 35 U.S.C. 154(b) by 683 days.

(21) Appl. No.: 16/604,606

(22) PCT Filed: Apr. 20, 2017

(86) PCT No.: PCT/FI2017/050303
§ 371 (c)(1),
(2) Date: Oct. 11, 2019

(87) PCT Pub. No.: WO2018/193152
PCT Pub. Date: Oct. 25, 2018

(65) Prior Publication Data
US 2021/0114157 A1    Apr. 22, 2021

(51) Int. Cl.
*B23Q 37/00*    (2006.01)
*B23Q 1/01*    (2006.01)

(52) U.S. Cl.
CPC .......... *B23Q 37/005* (2013.01); *B23Q 1/015* (2013.01); *B23Q 37/007* (2013.01)

(58) Field of Classification Search
CPC ..... B23Q 37/005; B23Q 1/015; B23Q 37/007
See application file for complete search history.

(56) References Cited

U.S. PATENT DOCUMENTS

| | | |
|---|---|---|
| 3,142,390 A | 7/1964 | Preeman |
| 3,322,289 A | 5/1967 | Wendell et al. |
| 3,804,269 A | 4/1974 | Varnum |
| 3,980,185 A | 9/1976 | Cain |
| 5,215,372 A | 6/1993 | Milstead |
| 6,516,935 B1 | 2/2003 | McLennan |

(Continued)

OTHER PUBLICATIONS

International Search Report and Written Opinion of the International Searching Authority, Application No. PCT/FI2017/050303, dated Jan. 19, 2018, 15 pages.

(Continued)

*Primary Examiner* — Nirvana Deonauth
(74) *Attorney, Agent, or Firm* — Ziegler IP Law Group, LLC

(57) ABSTRACT

A method of assembling a modular machine on-site. The modular machine includes a first container frame including a first machine module attachable to the first container frame, and a second container frame including a second machine module releasably attachable to the second container frame. Further, the first machine module and the second machine module are connectable to each other. The method includes arranging the first container frame on top of a support. Further, the second container frame is arranged to be in contact with the first container frame, wherein alignment means of the first container frame and alignment means of the second container frame are arranged in connection with each other. Moreover, the second machine module is released from the second container frame and moved from a transportation position to a working position. Additionally, the second machine module is connected to the first machine module.

8 Claims, 6 Drawing Sheets

(56) References Cited

U.S. PATENT DOCUMENTS

| | | |
|---|---|---|
| 6,899,511 B2 | 5/2005 | Gurevich et al. |
| 7,491,024 B2 | 2/2009 | Heinrichs et al. |
| 8,997,969 B2 | 4/2015 | Plakolm |
| 9,260,249 B2 | 2/2016 | Murphy et al. |
| 2013/0156533 A1 | 6/2013 | Yu et al. |

OTHER PUBLICATIONS

International Preliminary Report on Patentability, Application No. PCT/FI2017/050303.

MODULAR MACHINE AND METHOD OF ASSEMBLY

TECHNICAL FIELD

The present disclosure relates generally to modular machines; and more specifically, to methods of assembling modular machines.

BACKGROUND

Traditionally, industrial machines having small to intermediate dimensions such as machine tools, industrial robots and so forth, are transported to a manufacturing site (such as a manufacturing plant) in an assembled state. Further, the transportation of such machines may include moving the machines from one location to another, for example, from a location of a supplier to the manufacturing site. Moreover, the machines may be transported using transportation such as a semi-trailer truck and subsequently, unloaded at the manufacturing site. However, machines having substantially larger dimensions that may comprise more than one component part are generally required to be transported to a manufacturing site in an unassembled state and subsequently, assembled on-site.

Typically, such assembly of the machines on-site is associated with various problems. For example, the component parts of the machines may be required to be unloaded from the semi-trailer truck. Such unloading of the component parts may require presence of one or more highly skilled operators of machinery (such as cranes). It will be appreciated that the requirement of such highly skilled operators may increase a cost associated with transportation and assembly of the machines. Further, additional equipment (such as a machine adapter) may be required to enable a connection of the various component parts of the machines for the assembly thereof. Such requirement of the additional equipment increases complexity of the assembly of the machines and further increases the cost associated therewith. Moreover, subsequent to unloading the component parts at the manufacturing site, the component parts are arranged with one another. Such arrangement of the component parts may require an accurate alignment of the component parts in predetermined positions. It will be appreciated that a misalignment of the component parts of the machines may lead to an unsuccessful operation and/or breakdown of the machines. Further, such breakdown of the machines may compromise safety of workers at the manufacturing site.

Therefore, in light of the foregoing discussion, there exists a need to overcome the aforementioned drawbacks associated with on-site assembly of machines.

SUMMARY

The present disclosure seeks to provide a method of assembling a modular machine on-site. The present disclosure also seeks to provide a modular machine. The present disclosure further seeks to provide a solution to the existing problems associated with assembling machines having various component parts (or modules). An aim of the present disclosure is to provide a solution that overcomes at least partially the problems encountered in prior art, and provides a cost effective and easy to implement solution for assembling modular machines.

In one aspect, an embodiment of the present disclosure provides a method of assembling a modular machine on-site, comprising at least a first container frame comprising a first machine module attachable to the first container frame; and a second container frame comprising a second machine module releasably attachable to the second container frame, wherein the first machine module and the second machine module are connectable to each other, in which method a) the first container frame is arranged on top of a support;

b) the second container frame is arranged to be in contact with the first container frame, whereas alignment means of the first container frame and alignment means of the second container frame are arranged in connection with each other;

c) the second machine module is released from the second container frame and moved from a transportation position to a working position; and d) the second machine module is connected to the first machine module, wherein the step b) is performed before or after the step c).

In another aspect, an embodiment of the present disclosure provides a modular machine comprising a first container comprising a first frame, first alignment means and a first machine module attachable to the first container;

a second container comprising a second frame, second alignment means and a second machine module releasably attachable to the second container; and actuator means for moving the second machine module.

Embodiments of the present disclosure substantially eliminate or at least partially address the aforementioned problems in the prior art, and enable on-site assembly of a modular machine.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
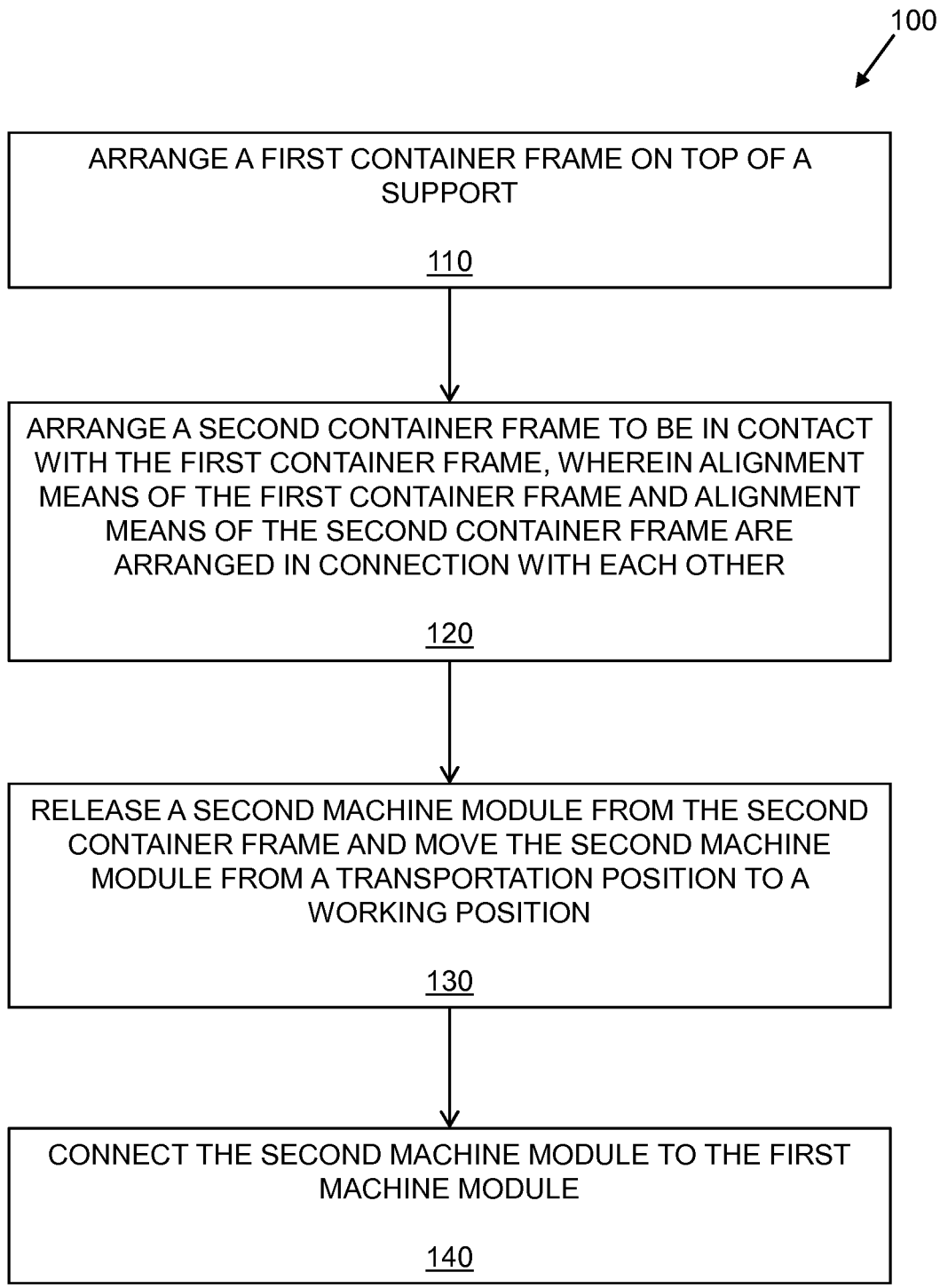
FIG. 1 is an illustration of steps of a method of assembling on-site, a modular machine, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method of assembling a modular machine on-site, comprising at least a first container frame comprising a first machine module attachable to the first container frame; and a second container frame comprising a second machine module releasably attachable to the second container frame, wherein the first machine module and the second machine module are connectable to each other, in which method a) the first container frame is arranged on top of a support;
b) the second container frame is arranged to be in contact with the first container frame, whereas alignment means of the first container frame and alignment means of the second container frame are arranged in connection with each other;
c) the second machine module is released from the second container frame and moved from a transportation position to a working position; and
d) the second machine module is connected to the first machine module, wherein the step b) is performed before or after the step c).

In another aspect, an embodiment of the present disclosure provides a modular machine comprising a first container comprising a first frame, first alignment means and a first machine module attachable to the first container;

a second container comprising a second frame, second alignment means and a second machine module releasably attachable to the second container; and actuator means for moving the second machine module.

The first container frame and the second container frame of the modular machine enable minimisation of potential damage to the first machine module and the second machine module during transportation (and/or storage) thereof. Such minimisation of damage reduces a requirement of highly skilled operators of machinery (such as cranes), thereby reducing the cost associated with transportation and assembly of the modular machine. Further, connection of the alignment means of the first container frame and the alignment means of the second container frame ensures an alignment of the first machine module and the second machine module. Such alignment reduces the requirement of additional equipment (such as a machine adapter), thereby reducing complexity of the modular machines and the cost associated with transportation and assembly thereof. Additionally, proper alignment of the first machine module with the second machine module enables a successful operation of the modular machine, and increases safety of workers at an assembly site of the modular machine.

Optionally, the first machine module and the second machine module are component parts of the modular machine that are integral for an operation thereof. In an example, the modular machine is an asphalt plant (such as an asphalt mixing plant) and the first and second machine modules are component parts (such as levels) of an aggregate elevator thereof. In such instance, the modular machine comprises more than two machine modules. However, it will be appreciated that the modular machine can comprise other structures, such as a building. In one example, the structure is a modular silo and the first and second machine modules are different levels of the silo.

Optionally, the first container frame and the second container frame comprise a casing of the first and second machine modules. Further, it will be appreciated that such casing enables protection of the machine modules during storage and/or transportation thereof. Also, the first and second container frames may have a different shape and/or dimensions as compared to the machine modules. In an example, the first and second container frames may be an integral part of the machine modules. Alternatively, the first and second container frames are externally attached to the first and second machine modules, for example, by welding.

The first container frame is arranged on top of a support. In an embodiment, the support is ground or a third container frame. For example, the first container frame is arranged on an assembly location (for example, a location on the assembly site) by an operator (such as a person responsible for operating a crane). Subsequently, the second container frame is arranged to be in contact with the first container frame. For example, the second container frame is lifted by operating the crane and arranged on top of the first container frame. Moreover, the alignment means of the first container frame and the alignment means of the second container frame are arranged in connection with each other. In such instance, the first container frame and the second container frame substantially align with each other. In an example, the alignment means of the first and second container frames comprises a mechanical alignment means. For example, the mechanical alignment means comprises a solid shaft that is arranged on the second container frame (or the first container frame) and is operable to be received into a bore of a hollow shaft arranged on the first container frame (or the second container frame). It will be appreciated that in such instance, the alignment of the containers is checked mechanically by ensuring that the solid shaft arranged on the second container frame is accommodated into the bore of the hollow shaft arranged on the first container frame. In another example, the alignment means comprises a laser alignment system.

Optionally, an actuator means is used for releasably attaching the second machine module to the second container frame. In an example, the actuator means comprises a linear slide arrangement and a stopper. Optionally, the actuator means further comprises a motor arrangement for applying a force to enable movement of the second machine module along the linear slide arrangement. Further, upon actuation, the actuator means is operable to move the second machine module along the linear slide arrangement from a first position to a second position. In an example, the first position relates to a fully engaged position of the second machine module, such as, the second machine module is held completely inside a volume defined by the second container frame. In another example, the second position relates to a partially or fully released position of the second machine module, such that, the second machine module is disengaged from the second container frame and lies partially or fully outside the volume defined by the second container frame. In another example, the actuator means comprises rods that are pivotally coupled to the second container frame and to the second machine module. It will be appreciated that such pivotal coupling of the second machine module to the second container frame enables a movement of the second machine module relative to the second container frame. For example, such relative movement of the second machine module includes an upward movement, a sideways movement, a diagonal movement, a rotational movement (change in orientation) and so forth, within the second container frame. Further, the second machine frame comprises one or more openings for receiving a stopper that is operable to prevent a pivotal movement (or rotation around a pivot) of the rods when the second machine module is required to be held in a required position. In an example, the one or more openings are arranged along a vertical column on the second container frame. In such instance, replacement of the stopper from one opening of the vertical column into another opening enables the position of the rods (and the second machine module) to be changed within the second container frame. For example, arrangement of the stopper in a first (or topmost) opening of the vertical column of openings may fix the rod in an angle of 60° with respect to the horizontal. However, arrangement of the stopper in a second opening of the vertical column of openings may fix the rod in an angle of 45° with respect to the horizontal. Optionally, arrangement of the stopper in one of the openings allows a limited range of pivotal movement of the rods. For example, arrangement of the stopper in the second opening of the vertical column of openings allows pivoting of the rods in a range of 45° to 60° with respect to the horizontal. In one example, the stopper is a bolt that is received into one of the openings in the second container frame. Optionally, the actuator means may also comprise a motor arrangement having one or more motors for applying a force to enable the pivotal movement of the rods.

Optionally, the first container frame and the second container frame have a substantially similar shape and/or dimensions. In an example, the first container frame and the second container frame have a cuboidal shape with a same length and width. However, it will be appreciated that when the container frames are arranged on top of one another, the container frames may have different depths (or height) with respect to each other. Optionally, at least the second container frame is provided with at least one wall element and a cover element connectable to the second container frame, and before arranging the second container frame on top of the first container frame, the at least one wall element and the cover element are removed from the second container frame. In an example, the second container frame has a cuboidal shape and is arranged on top of the first container frame. In such instance, the second container frame comprises a cover element on an underside thereof and a wall element on each of five other sides of the cuboid. Similarly, the first container frame (having the same cuboidal shape and dimensions as the second container frame) comprises a cover element on a topside thereof and a wall element on each of five other sides of the cuboid. In such instance, prior to arrangement of the second container frame to be in contact with the first container frame, the cover elements from both the container frames are removed to enable the connection of the second machine module to the first machine module. In another example, the second container frame has a cubical shape and is arranged alongside the first container frame. In such instance, the second container frame may have the cover element on a left (or right) side thereof. Consequently, the first container frame having the same cubical shape and dimensions as the second container frame may have the cover element on a right (or left) side thereof. Moreover, prior to arrangement of the containers alongside each other, the cover elements may be removed to enable the first machine module to be connected to the second machine module. In yet another example, the second container frame (or the first container frame) is provided with a cover element on one side and wall elements on remaining sides thereof. In such instance, the wall elements are also removable from the second container frame. Such arrangement of removable cover and wall elements on all sides of the second container frame allows one or more of the elements to be removed, for example, to repair the second machine module included in the second container frame.

Optionally, in the transportation position, the second machine module is inside a volume defined by the second container frame. For example, the transportation position of the second machine module refers to the fully engaged (or first) position thereof in the second container frame. Such arrangement of the second machine module in the fully engaged position in the second container frame enables the second machine module to be transported from one site to another, for example, by arrangement of the second container frame on a semi-trailer truck. Alternatively, the second machine module is stored in the transportation position when in a non-operating (or unused) state. Optionally, in the working position, the second machine module protrudes partially outside the volume defined by the second container frame. In an embodiment, the second machine module is moved to its working position by the actuator means. For example, subsequent to removal of the cover element of the second container frame and applying a force (such as, by a motor arrangement) to allow the rods of the actuator means to pivot, the second machine module is operable to be released from the transportation position. However, in such instance, the second machine module is not completely disengaged from the second container frame and therefore, the second machine module partially protrudes outside the volume defined by the second container frame. In an example, the second container frame has a cuboidal shape and a cover element on an underside thereof is removed. In such instance, the second machine module is operable to partially protrude from the underside of the second container frame. However, it will be appreciated that the second machine module may be made to partially protrude from other sides of the second container frame such as a topside thereof.

Optionally, the second machine module that partially protrudes outside the volume defined by the second container frame enables a person (such as a mechanic) to connect the second machine module with the first machine module. For example, the mechanic may connect a protruding portion of the second machine module with a protruding portion of the first machine module by using a fastening arrangement (such as screws). In another example, a mechanic may permanently connect the protruding portions of the first and second machine modules, such as, by welding the connection of the first and second machine modules.

Optionally, the working position of the second machine module refers to a fully released (or second) position of the second machine module. In such instance, the second machine module is removably coupled to the second container frame in the transportation position and completely disengaged from the second container frame in the working position.

Optionally, the second machine module is released from the second container frame and moved from a transportation position to a working position prior to arrangement of the second container frame to be in contact with the first container frame. In an example, the second machine module is allowed to protrude a distance 'd1' outside the volume defined by the second container frame. Further, the first machine module is depressed by the distance 'd1' into a volume defined by the first container frame. In such instance, subsequent to the second machine module attaining the working position, the second container frame is arranged to be in contact with the first container frame. Further, the second machine module is connected to the first machine module such that a connection therebetween is made inside the volume defined by the first container frame. In another example, the second machine module is allowed to protrude a distance 'd1' outside the volume defined by the second container frame and the first machine module is depressed by a distance 'd2' into the volume defined by the first container frame. Further, the distance 'd1' is more than the distance 'd2'. In such instance, a connection between the second machine module and the first machine module is made inside the volume defined by the first container frame. However, it will be appreciated that when the distance 'd1' is less than the distance 'd2', a connection is not established between the second machine module and the first machine module.

Optionally, the first container frame comprises the first machine module that is releasably attachable to the first container frame. For example, the first machine module may be released using an actuator means from the first container frame prior or subsequent to arrangement of the second container frame to be in contact with the first container frame. In one example, the actuator means comprise rods that are pivotally coupled to the first container frame and to the first machine module. In another example, the first container frame is provided with at least one wall element and a cover element connectable to the first container frame, such that one or more of the elements can be removed from the first container frame. In such instance, the one or more elements are removed to enable connection of the second machine module with the first machine module. For example, the one or more elements of the first container frame are removed to repair the first machine module included in the first container frame.

Optionally, the modular machine is disassembled by disconnection of the second machine module from the first machine module. For example, a person (such as a mechanic) may remove the fastening arrangement included in the protruding portion of the second machine module to enable the disconnection. Subsequently, the second machine module (and/or the first machine module) is moved from the working position to the transportation position thereof. Further, the second container frame is removed from contact with the first container frame, for example, using a crane to lift the second container frame from the first container frame. In such instance, the stoppers included with the rods prevent the second machine module from disengaging from the second container frame and falling down. Subsequently and optionally, the first container frame is removed from the support (such as ground).

It will be appreciated that the modular machine may comprise more than two container frames and associated machine modules. In an example, the modular machine comprises three container frames such that the first container frame is arranged to be in contact with a third container frame and subsequently, the second container frame is arranged to be in contact with the first container frame. In such instance, the first machine module is connected to the third machine module and subsequently, the second machine module is connected to the first machine module.

Optionally, the actuator means is configured to releasably attach the second machine module to the second container.

Furthermore, at least one of the first container and the second container may comprise
   at least one wall element connectable to the container frame, and
   a cover element connectable to the container frame,
to protect the machine module inside the container during storage and/or transportation of the modular machine.

DETAILED DESCRIPTION OF THE DRAWINGS

FIG. 1 is an illustration of steps of a method 100 of assembling on-site, a modular machine, in accordance with an embodiment of the present disclosure. At step 110, a first container frame is arranged on top of a support. At step 120, a second container frame is arranged to be in contact with the first container frame, wherein alignment means of the first container frame and alignment means of the second container frame are arranged in connection with each other. At step 130, a second machine module is released from the second container frame and moved from a transportation position to a working position. At step 140, the second machine module is connected to the first machine module. The step 120 is performed before or after the step 130.

The steps 110 to 140 are only illustrative and other alternatives can also be provided where one or more steps are added, one or more steps are removed, or one or more steps are provided in a different sequence without departing from the scope of the claims herein. In one example, the support is ground or a third container frame. In another example, at least the second container frame is provided with at least one wall element and a cover element connectable to the second container frame, and before arranging the second container frame on top of the first container frame, the at least one wall element and the cover element are removed from the second container frame. In yet another example, in the transportation position, the second machine module is inside a volume defined by the second container frame. Alternatively, in the working position, the second machine module protrudes partially outside of a volume defined by the second container frame. In an example, the second machine module is moved to its working position by an actuator means. In another example, the actuator means is used for releasably attaching the second machine module to the second container frame.

Figure 2:
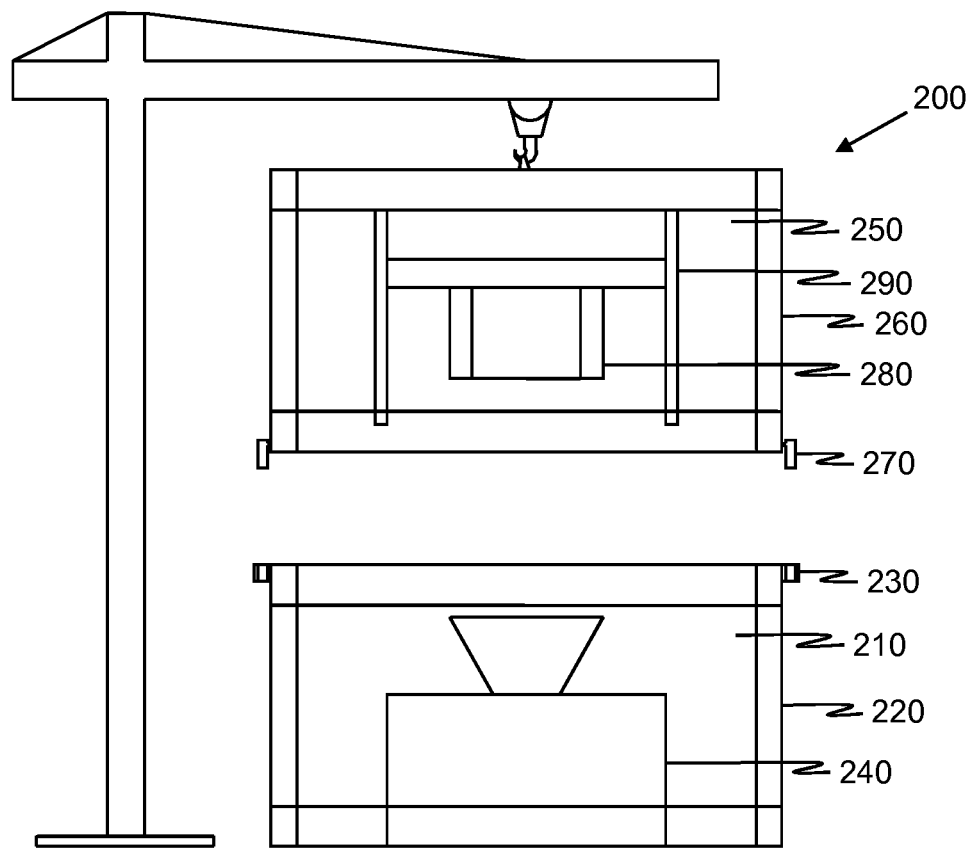
FIG. 2 is a schematic illustration of a modular machine, in accordance with an embodiment of the present disclosure.

FIG. 2 is a schematic illustration of a modular machine 200, in accordance with an embodiment of the present disclosure. The modular machine 200 comprises a first container 210 comprising a first frame 220, first alignment means 230 and a first machine module 240 attachable to the first container 210. The modular machine 200 also comprises a second container 250 comprising a second frame 260, second alignment means 270 and a second machine module 280 releasably attachable to the second container 250. The modular machine 200 further comprises an actuator means 290 for moving the second machine module 280.

Figure 3:
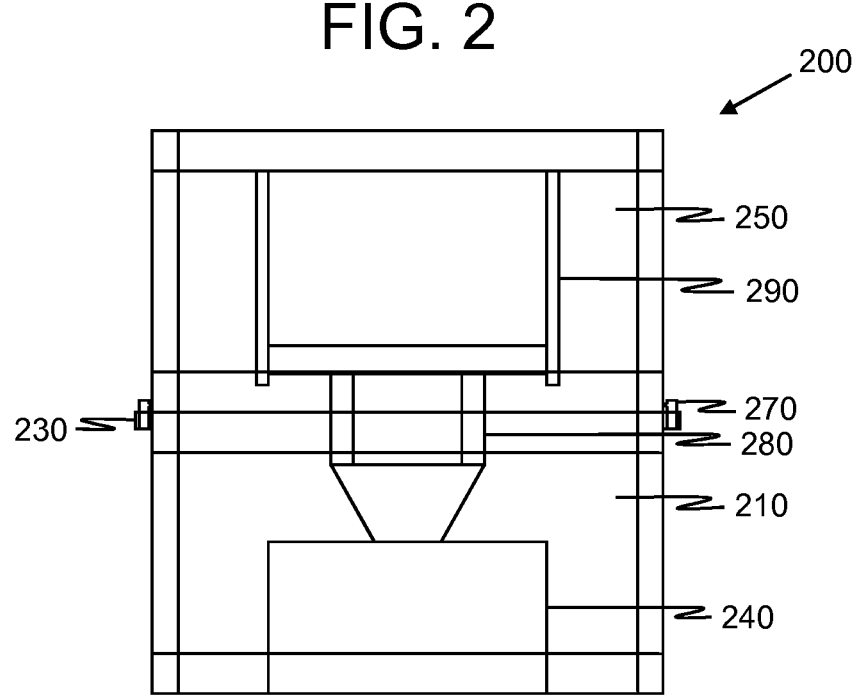
FIG. 3 is a schematic illustration of the modular machine of FIG. 2 in an assembled state, in accordance with an embodiment of the present disclosure.

FIG. 3 is a schematic illustration of the modular machine 200 in an assembled state, in accordance with an embodiment of the present disclosure. As shown, the second container 250 is arranged on the first container 210. Moreover, and the alignment means 270 of the second container 250 and the alignment means 230 of the first container 210 are arranged in connection with each other. Further, the second machine module 250 has been moved to its working position by the actuator means 290 and the second machine module 250 is connected to the first machine module 210.

Figure 4:
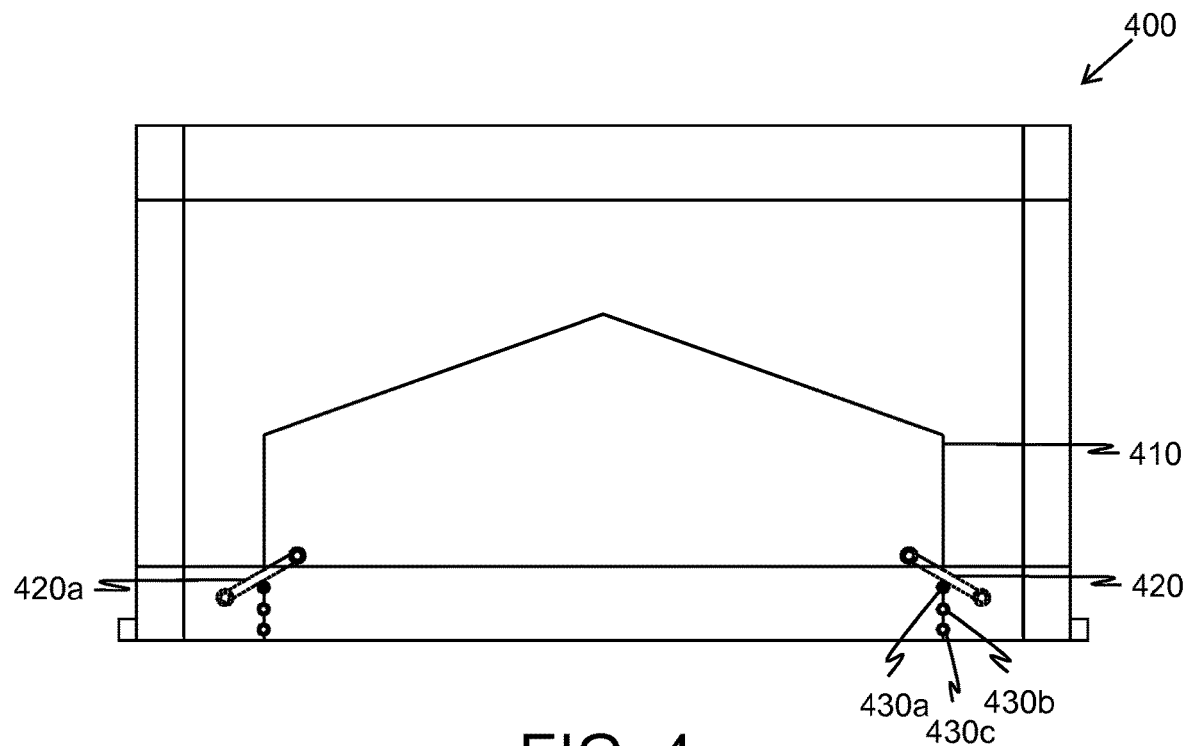
FIG. 4 is a schematic illustration of a second container, in accordance with an embodiment of the present disclosure.

FIG. 4 is a schematic illustration of a second container 400, in accordance with an embodiment of the present disclosure. As shown, the second container 400 comprises the second machine module 410 that is releasably attached to the second container 400 using the actuator means 420. Further, the actuator means 420 comprises rods 420, 420a that are pivotally coupled to the second container 400 and to the second machine module 410. Additionally, the second machine module 410 comprises openings 430a, 430b, 430c that are arranged along a vertical column on the second container 400. As shown, a stopper (such as a bolt) has been inserted into the opening 430a to prevent a pivotal movement of the rod 420 when the second machine module 410 is required to be held in a transportation position. As shown, in the transportation position, the second machine module 410 is inside a volume defined by the second container 400.

Figure 5:
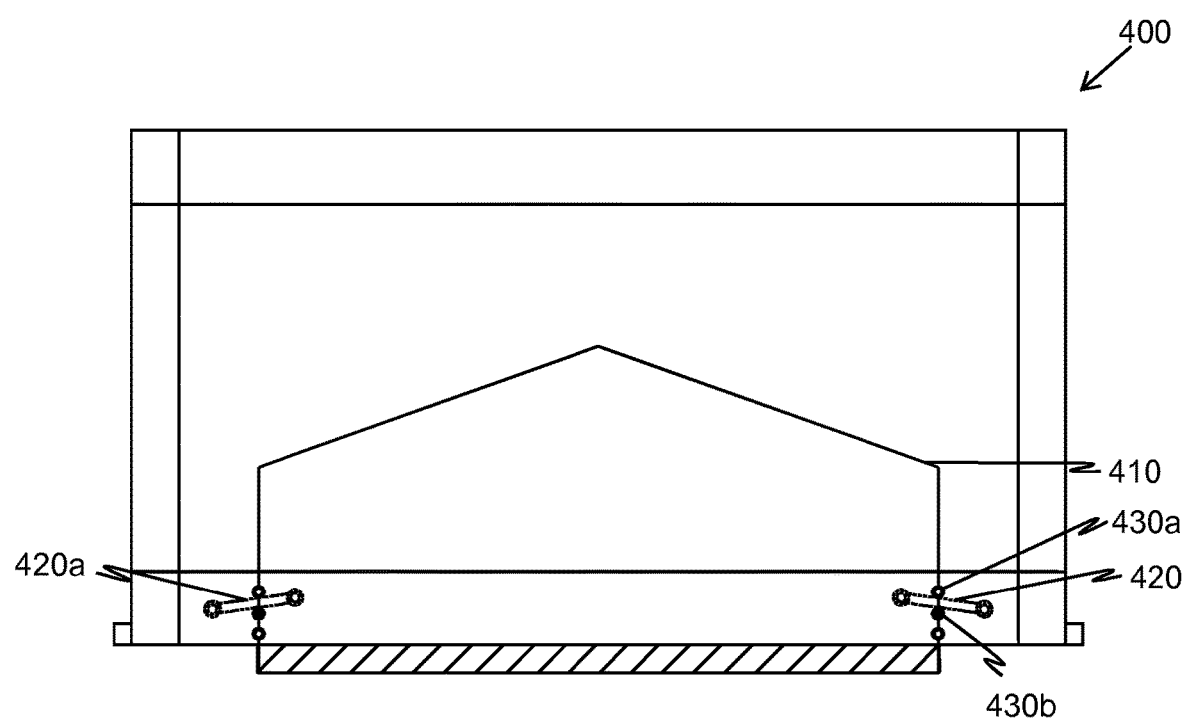
FIG. 5 is a schematic illustration of the second container of FIG. 4, in accordance with another embodiment of the present disclosure.

FIG. 5 is a schematic illustration of the second container 400, in accordance with another embodiment of the present disclosure. As shown, the stopper has been removed from the opening 430a and reinserted into the opening 430b, thereby allowing a partial pivotal movement of the rods 420, 420a. Consequently, the second machine module 410 has been moved from a transportation position to a working position, wherein the second machine module 410 protrudes partially outside of the volume defined by the second container 400.

Figure 6:
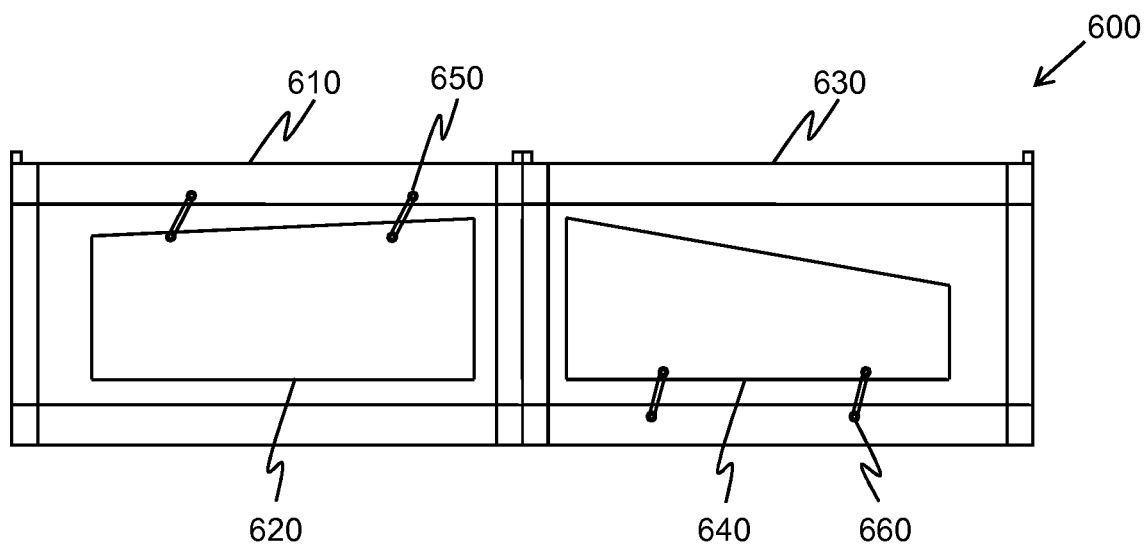
FIG. 6 is a schematic illustration of a modular machine, in accordance with another embodiment of the present disclosure.

FIG. 6 is a schematic illustration of a modular machine 600, in accordance with another embodiment of the present disclosure. The modular machine 600 comprises a first container 610 having a first module 620, and a second container 630 having a second module 640. Additionally, the first container 610 comprises an actuator means 650 that is configured to attach the first machine module 620 to the first container 610. Further, the second container 630 comprises an actuator means 660 that is configured to attach the second machine module 640 to the second container 630. As shown, the second container 630 is arranged alongside the first container 610. Further, the second machine module 640 of the second container 630 is in a transportation position.

Figure 7:
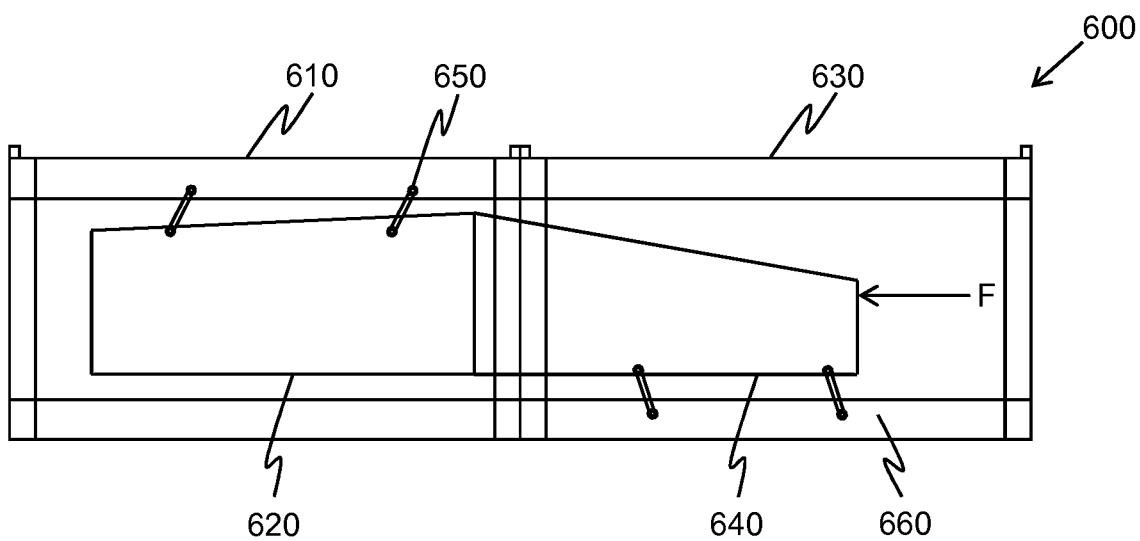
FIG. 7 is a schematic illustration of the modular machine of FIG. 6 in an assembled state, in accordance with an embodiment of the present disclosure.

FIG. 7 is a schematic illustration of the modular machine 600 in an assembled state, in accordance with an embodiment of the present disclosure. As shown, the second machine module 640 has been moved from the transportation position to a working position, by allowing a pivotal movement of the actuator means 660 and application of force F. Subsequently, the second machine module 640 is connected to the first machine module 620. As shown, the connection between the second machine module 640 to the first machine module 620 is made in a volume defined by the first container 610.

Figure 8:
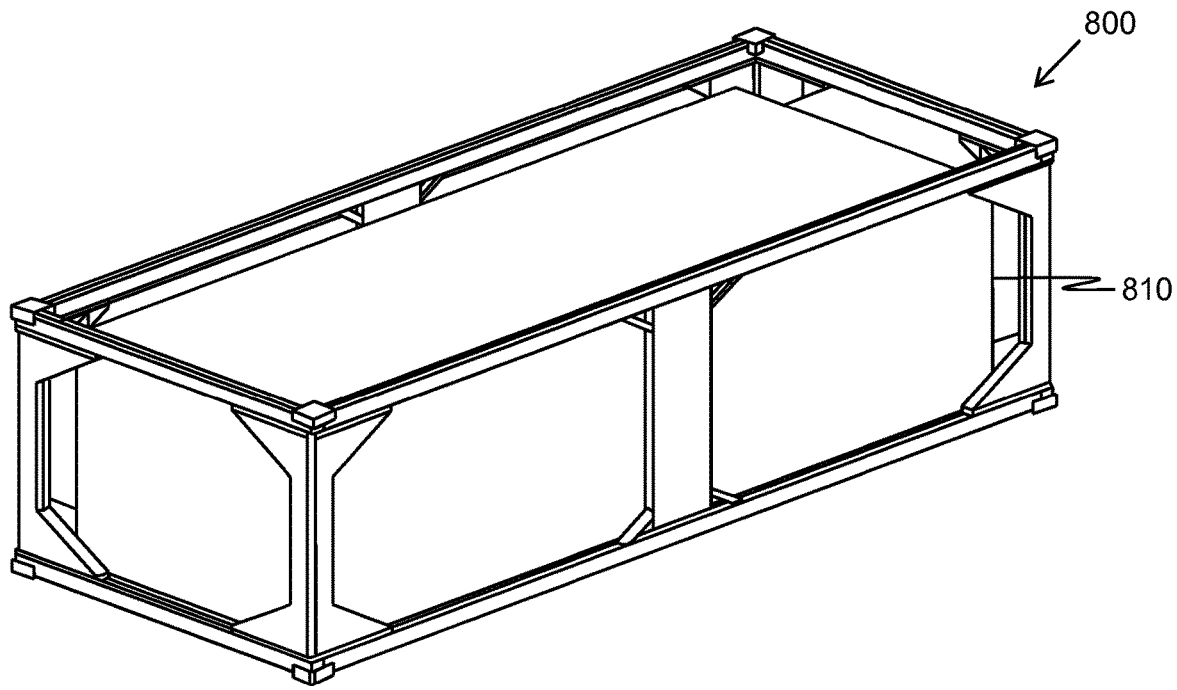
FIG. 8 is a perspective view of a second container comprising a second machine module in a transportation position, in accordance with an embodiment of the present disclosure.

FIG. 8 is a perspective view of a second container 800 comprising a second machine module 810 in a transportation position, in accordance with an embodiment of the present disclosure. As shown, in the transportation position, the second machine module 810 is inside a volume defined by the second container 800.

Figure 9:
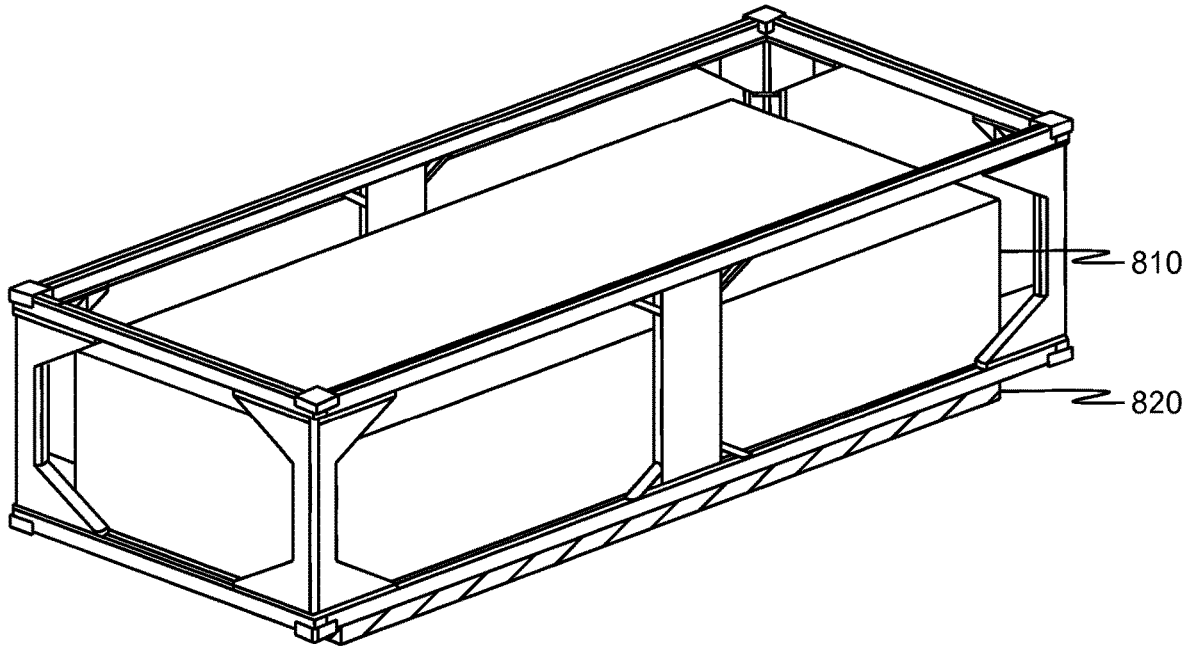
FIG. 9 is a perspective view of the second container of FIG. 8 with the second machine module moved from the transportation position to a working position, in accordance with an embodiment of the present disclosure.

FIG. 9 is a perspective view of the second container 800 with the second machine module 810 moved from the transportation position to a working position, in accordance with an embodiment of the present disclosure. As shown, in the working position, the second machine module 810 protrudes partially outside of the volume defined by the second container 800, at a bottom portion 820 of the second machine module 810.

Figure 10:
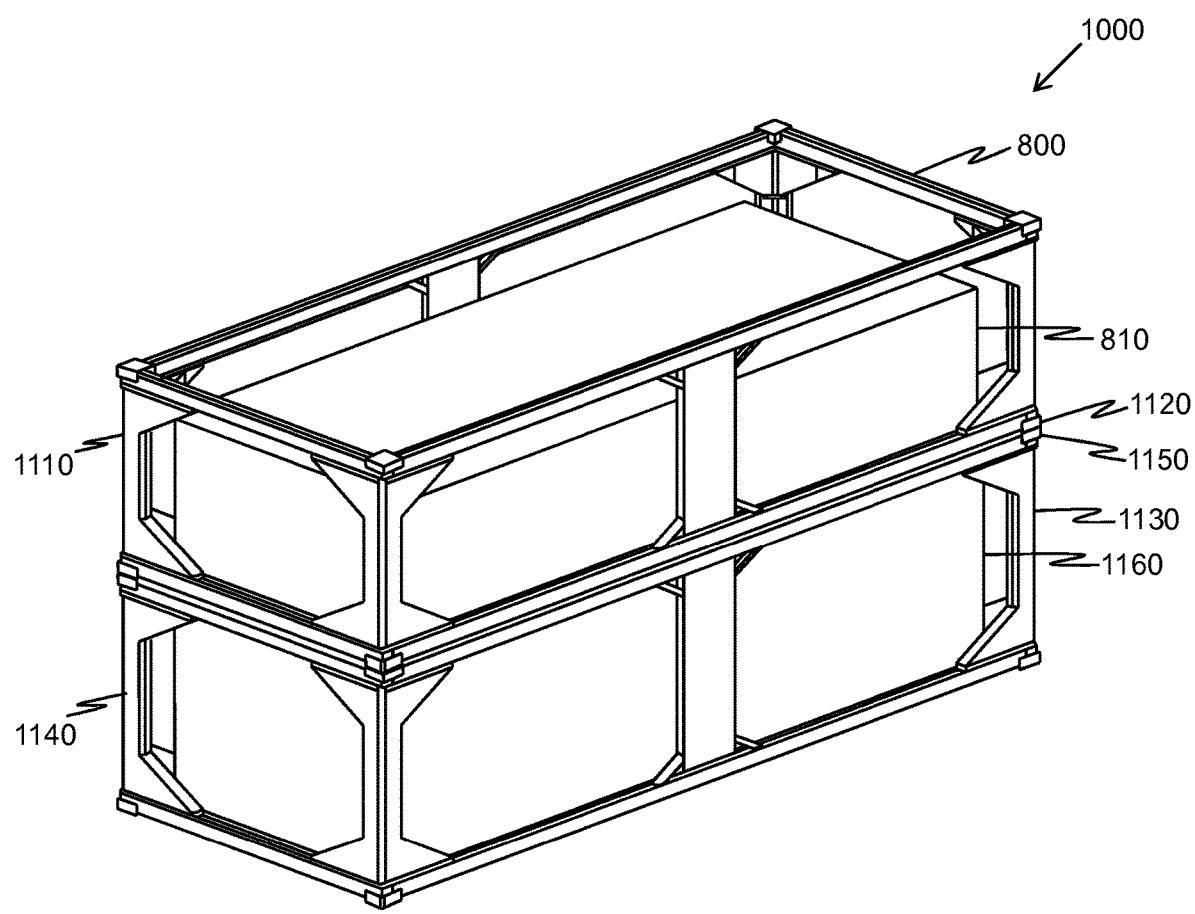
FIG. 10 is a perspective view of a modular machine comprising the second container of FIG. 9, in accordance with an embodiment of the present disclosure.

FIG. 10 is a perspective view of a modular machine 1000 comprising the second container 800, in accordance with an embodiment of the present disclosure. The second container 800 comprises a second frame 1110, second alignment means 1120 and the second machine module 810 releasably attached to the second container 800. The modular machine 1000 also comprises a first container 1130 comprising a first frame 1140, first alignment means 1150 and a first machine module 1160 attached to the first container 1130. As shown, the modular machine 1000 is in an assembled state. Such assembled state of the modular machine 1000 is obtained by arrangement of the second container 800 comprising the second machine module 810 in the working position, to be in contact with the first container 1130. Further, the second machine module 810 that partially protrudes outside of the volume defined by the second container 800 is connected to the first machine module 1160 of the first container 1130. Additionally, alignment of the second container 800 with the first container 1130 is ensured by alignment of the second alignment means 1120 with the first alignment means 1150.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method of assembling a modular machine on-site, comprising at least
    a first container having a first container frame comprising a first machine module attachable to the first container frame; and
    a second container having a second container frame comprising a second machine module releasably attachable to the second container frame,
wherein the first machine module and the second machine module are connectable to each other, the method further comprising the steps of:
a) the first container frame is arranged on top of a support;

b) the second container frame is arranged to be in contact with the first container frame, wherein alignment means of the first container frame and alignment means of the second container frame are arranged in connection with each other;

c) the second machine module is released from the second container frame and moved via actuator means from a transportation position to a working position wherein the second machine module protrudes partially outside of a volume defined by the second container frame; and d) the second machine module is connected to the first machine module, wherein the step b) is performed before or after the step c).

2. The method according to claim 1, wherein, in the transportation position, the second machine module is inside the volume defined by the second container frame.

3. The method according to claim 1, wherein the actuator means is used for releasably attaching the second machine module to the second container frame.

4. The method according to claim 1, wherein at least the second container frame is provided with at least one wall element and a cover element connectable to the second container frame, and before arranging the second container frame on top of the first container frame, the at least one wall element and the cover element are removed from the second container frame.

5. The method according to claim 1, wherein the support is ground or a third container frame.

6. A modular machine comprising
a first container comprising a first frame, first alignment means and a first machine module attachable to the first container;
a second container comprising a second frame, second alignment means and a second machine module releasably attachable to the second container; and
actuator means for moving the second machine module from a transportation position to a working position wherein the second machine module protrudes partially outside of a volume defined by the second container frame,
wherein the first machine module and the second machine module are connectable to each other.

7. A modular machine according to claim 6, wherein the actuator means is configured to releasably attach the second machine module to the second container.

8. A modular machine according to claim 6, wherein at least one of the first container and the second container comprises
at least one wall element connectable to the container frame, and
a cover element connectable to the container frame,
to protect the machine module inside the container during storage and/or transportation of the modular machine.

* * * * *